United States Patent [19]

Ricles

[11] Patent Number: 5,330,196

[45] Date of Patent: Jul. 19, 1994

[54] TRAILER HITCH GUIDE

[76] Inventor: Richard Ricles, 951 Broken Sound Pkwy., Suite 200, Boca Raton, Fla. 33487

[21] Appl. No.: 189,601

[22] Filed: Feb. 1, 1994

[51] Int. Cl.⁵ .............................................. B60D 1/36
[52] U.S. Cl. .................................... 280/477; 280/511
[58] Field of Search ............... 280/477, 504, 507, 508, 280/511

[56] References Cited

U.S. PATENT DOCUMENTS 4,844,496  7/1989  Webb et al. ................... 280/511 X
4,871,184 10/1989  Johnson ............................. 280/477
5,236,215  8/1993  Wylie .................................. 280/477

FOREIGN PATENT DOCUMENTS 2250966  6/1992  United Kingdom ................ 280/507

Primary Examiner—Margaret A. Focarino
Assistant Examiner—Victor E. Johnson

[57] ABSTRACT

For use with a towing vehicle having a hitch ball on a rearwardly extending bar support, a V-shaped guide to facilitate hitching a trailer to the ball in which to position the guide to withstand hitching forces it is mounted vertical in the clearance between adjacent walls and has a notch in a lower edge which also forms a tongue and groove connection with the bar support.

1 Claim, 1 Drawing Sheet

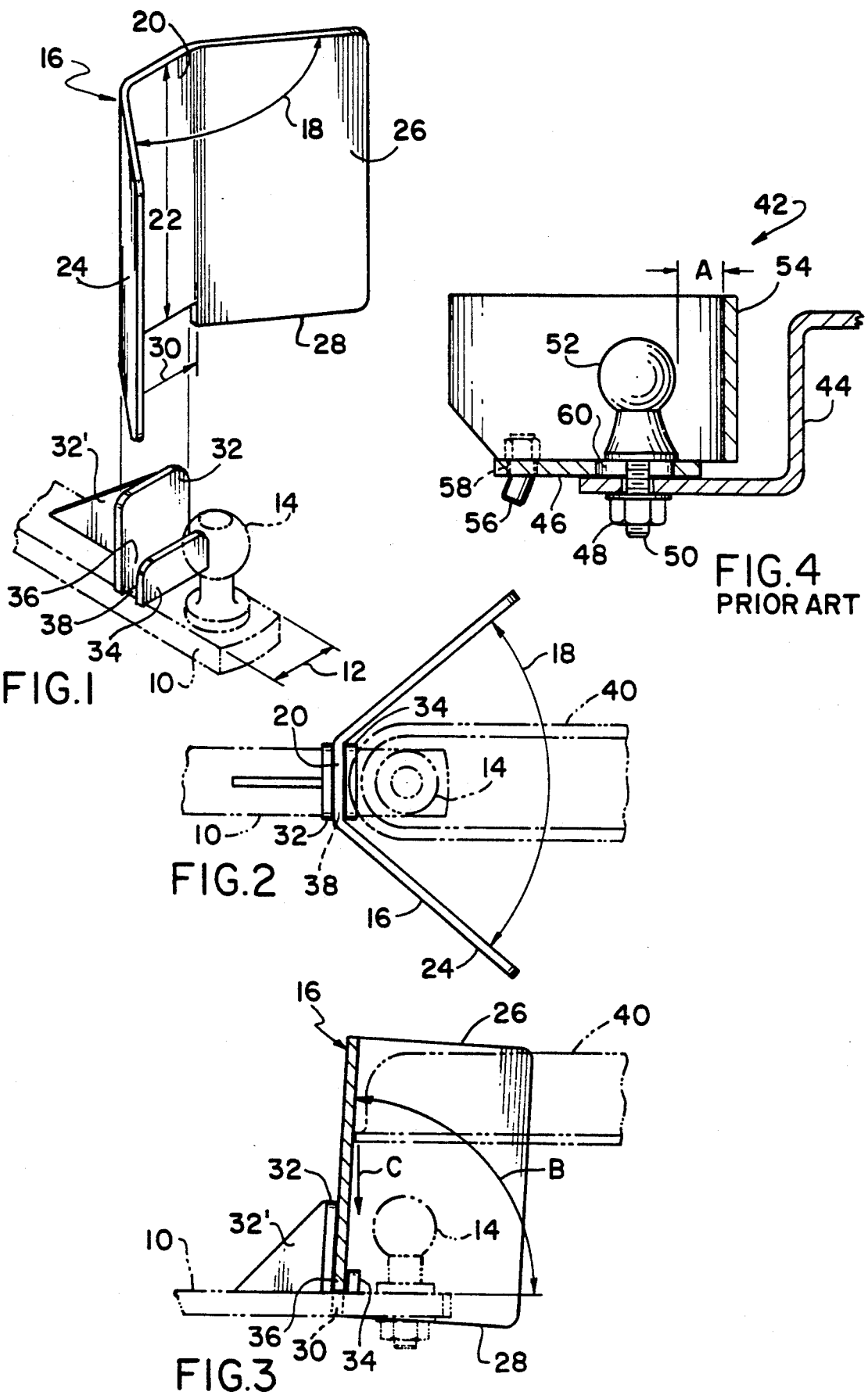

TRAILER HITCH GUIDE

BACKGROUND OF THE INVENTION

The present invention relates generally to a V-shaped plate of a type serving as a guide when mounted vertically on a rearwardly extending support of a towing vehicle in surrounding relation to a hitch ball to facilitate the hitching of a boat trailer or other trailer to the hitch ball and, more particularly, to improvements in the manner in which the V-shaped guide is assembled, preparatory to the hitching procedure, to the towing vehicle support so as to withstand the impact forces that are involved and yet retain the convenience of its being readily attachable and detachable to the towing vehicle support.

EXAMPLE OF THE PRIOR ART

In use are numerous devices for facilitating the hitching of a trailer to a towing vehicle, such as the V-shaped plate denominated a "Trailer Hitch Guide" in U.S. Pat. No. 4,840,392 issued to Baskett on Jun. 20, 1989. The Baskett guide is provided with depending studs 36 which project through plate openings in completing the ready attachment thereof behind and in surrounding relation to a hitch ball, and in the just described operative position effectively guides a hollow sphere or so-called trailer tongue in attached covering relation over the hitch ball. The use of depending attaching lugs in the style of Baskett or by mechanical equivalents in similarly functioning hitch guides contributes in an obvious manner to the ease of attachment and detachment of the guide, but is vulnerable to shearing in the event that the force of the trailer tongue against the guide is excessive during the hitching procedure.

SUMMARY OF THE INVENTION

Broadly, it is an object to provide a trailer hitch guide overcoming the foregoing and other shortcomings of the prior art. More particularly, it is an object to mount the V-guide vertically in trailer tongue-guiding relation to the hitch ball also advantageously using depending structural features for ease in the positioning thereof, but obviating the use of lug-sized structures vulnerable to shearing. Rather a "tongue and groove" type connection is established for the V-guide to supplement the vertical positioning structure thereof, to contribute to a firm interconnection while still characterized by ease of assembly and disassembly all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

BRIEF DESCRIPTION OF THE DRAWINGS

FIG. 1 is a perspective view illustrating the positioning of the V-shaped hitch guide component of the within inventive trailer hitch guide;

FIG. 2 is a plan view of the operative position of the trailer hitch guide component of FIG. 1;

FIG. 3 is a side elevational view projected from FIG. 2; and

FIG. 4 is a sectional side elevational view of a prior art trailer hitch guide provided for comparison to better illustrate the structural differences therebetween.

DESCRIPTION OF THE PREFERRED EMBODIMENT

This invention is an improved trailer hitch guide of the type described and illustrated in numerous prior patents, as exemplified by the trailer hitch guide of U.S. Pat. No. 4,840,392 issued to Baskett on Jun. 20, 1989. As well understood and best illustrated in FIG. 1, a V-shaped component, generally designated 16 positioned on the towing vehicle is required in use to withstand the impact of a coupling component 40 (FIG. 2) of the towed trailer, during which the coupling 40 is guided into engagement with a hitch ball 14. The commercial acceptance of the V-shaped guiding component 16 is dependent on its ease of attachment and detachment despite being positioned with sufficient firmness and stability to withstand the impact noted.

To the above end, on a towing vehicle rearward support 10 a triangular brace 32' mounts an upstanding wall 32 in relation to a cooperating wall 34 defining therebetween a clearance 38 bounding a compartment 36 to receive therein the medial panel 20 located between opposite side angularly oriented panels 24 and 26 of the V-shaped guide 16. For the utilitarian reasons which soon will be better understood, the height 22 of panel 20 is selected to be less than the height of the side panels 24 and 26 and the width 30 thereof to be equal to the width 12 of the towing vehicle support 10. This height and width embodied in panel 20 of the V-guide 16 thus results in a depending edge 28 on each of the side panels 24, 26 which bound a groove 30 between said edges 28 and, in use, it is into the groove 30 that the length portion 38 between the walls 32, 34 project during the positioning of the V-guide 16 on the support 10. The interconnection of the length portion 38 of support 10 in the groove 30 provides what in mechanical parlance is commonly known as a tongue and groove connection, which connection supplements the positioning of the V-guide 16 in a vertical orientation in the compartment 36.

As best illustrated in FIG. 3, another feature of the within trailer hitch guide is selecting a lesser height for the front wall 34 so that there is a slight pivotal traverse initially forward and, upon contact subsequently rearward, as per arrow B, which avoids binding at the contact between the upper edge of groove 30 with the tongue 38, and also descending movement C of an appropriately hollow shaped underside of coupling 40 to the hitch ball 14. After the interconnection of coupling 40 to hitch ball 14, the V-shaped guide 16, having served its purpose, is readily removed from its operative position on the support 10 without any unthreading of nuts from threaded bolts, or other disengaging procedures.

In contrast, in a typical prior art hitch guide 42 illustrated in FIG. 4, to the towing vehicle support 44, a jig plate 46 is fastened to the horizontally oriented length portion thereof by a nut 48 threadably engaged to a depending screw shank 50 of the hitch ball 52. The V-guide 54 advantageously has depending studs 56 which seat in openings 58 in plate 46. Usually an elongated slot 60 is embodied in plate 46 to provide a range of positions at a distance A between the guide 54 and hitch ball 52 and, after an appropriate position is selected, the plate 46 is welded in place. While the V- guide 54 is removable by withdrawing the studs 56 from plate 46, if the impact against the V-guide 54 is inadvertently excessive, the studs 56 are vulnerable to shear.

While the hitch guide herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A trailer hitch guide comprising a rearwardly extending support of a selected width for supporting thereon an attachable and detachable hitch guide, a hitch ball in upstanding relation integral on an end of said support, a V-shaped hitch guide for facilitating engagement to said hitch ball presenting a V-shaped compartment bounded by a rectangular central panel of the same width as said support and of a selected height and having opposite angularly oriented side panels of identical heights sized larger than said height of said central panel for providing a depending bottom edge on each side panel forming therebetween along a bottom edge of said central panel a hitch guide connection groove, cooperating spaced apart hitch guide-supporting panels integral on said support rearwardly of said hitch ball bounding therebetween a hitch guide positioning compartment, and said hitch guide having an operative position disposed with said central panel in said positioning compartment and a length portion of said support in said connection groove, whereby use of said positioning compartment contributes to the attachment of said hitch guide to said support which is supplemented also by said support length portion serving as a tongue in said connection groove.

* * * * *